April 12, 1938.  W. W. SLOANE  2,114,153

DRIVE MECHANISM FOR SHAKER CONVEYERS

Original Filed March 31, 1936   3 Sheets—Sheet 1

Inventor
William W. Sloane
Clarence F. Poole
Attorney

April 12, 1938.　　　W. W. SLOANE　　　2,114,153
DRIVE MECHANISM FOR SHAKER CONVEYERS
Original Filed March 31, 1936　　　3 Sheets-Sheet 2

Inventor
William W. Sloane
Clarence F. Poole
Attorney

April 12, 1938.  W. W. SLOANE  2,114,153
DRIVE MECHANISM FOR SHAKER CONVEYERS
Original Filed March 31, 1936  3 Sheets-Sheet 3

Inventor
William W. Sloane
Clarence F. Poole
Attorney

Patented Apr. 12, 1938

2,114,153

UNITED STATES PATENT OFFICE 2,114,153

DRIVE MECHANISM FOR SHAKER CONVEYERS

William W. Sloane, Chicago, Ill., assignor to Goodman Manufacturing Company, Chicago, Ill., a corporation of Illinois Application March 31, 1936, Serial No. 71,966
Renewed July 3, 1937

10 Claims. (Cl. 198—220)

This invention relates to improvements in drive mechanisms for shaker conveyers of the type utilized for conveying loose material such as coal and more particularly to a conveyer drive mechanism in which the conveying effect of the drive mechanism may be changed to suit varying conditions.

Among the objects of my invention are to provide a more efficient conveyer drive mechanism than formerly by providing an improved mechanism of a novel and simplified construction for changing the angular velocity of the drive crank so the crank may rotate at a predetermined variable acceleration and drive a rocking member through a relatively short connecting rod, which rocking member forms a drive member for the conveyer trough line. Another object of my invention is to provide a conveying mechanism wherein the intensity of the conveying action may readily be varied to accommodate the drive to varying grades or lengths or weights of pan lines without increasing the maximum stresses on the drive.

A prior application, Serial No. 57,730, filed January 6, 1936, discloses a drive mechanism operating on principles similar to those of my present invention. The device of my present invention, however, differs from that of my prior invention in the means for varying the angular velocity of the drive crank.

Other objects of my invention will appear from time to time as the accompanying specification proceeds.

My invention may be more clearly understood with reference to the accompanying drawings in which.

Figure 8:
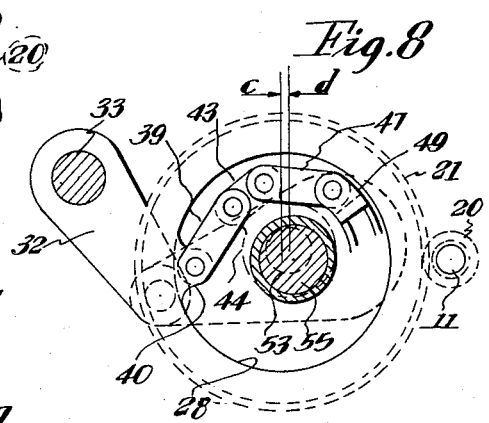
Figure 7:
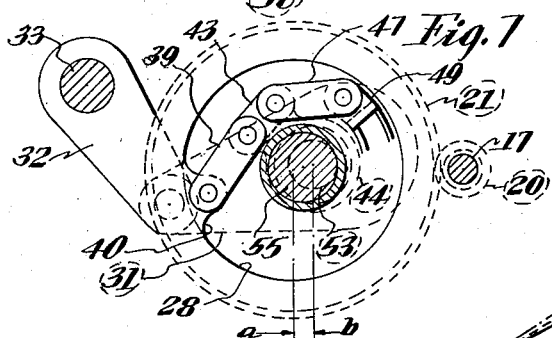
Figure 10:
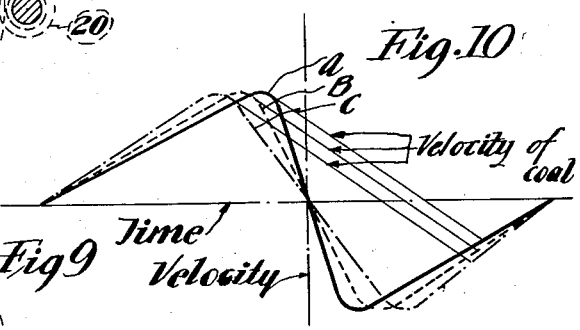
Figure 9:
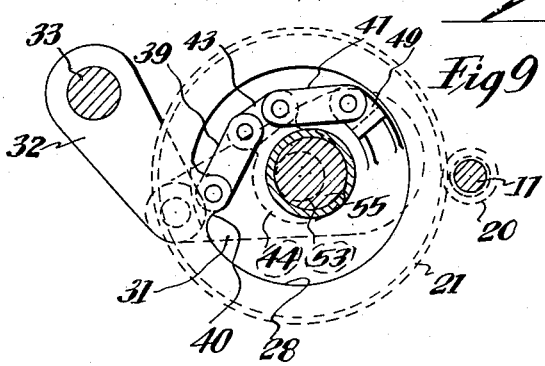

Figures 7, 8, and 9 are diagrammatic views illustrating various relationships of the parts of the drive mechanism which will impart various intensities of drive actions to the conveyer trough line; and Figure 10 is a diagram or graph showing certain hypothetical velocity curves of shaker motions attained by the mechanism illustrated herein.

In the drawings, the preferred embodiment of my invention illustrated is shown as comprising a shaker drive mechanism, indicated generally by reference character 10. Said drive mechanism is mounted on a base plate 11 adapted to be held in position on the mine floor in the usual manner, as by a plurality of jacks (not shown) adapted to be interposed between the mine roof and said base plate.

The drive mechanism 10 comprises a housing and support frame 12 mounted on the base plate 11 in a suitable manner. A portion of the outside of said housing is recessed adjacent one end thereof and has a bracket 14 extending outwardly therefrom at the inner termination of said recessed portion which forms a support means for a motor 13. Said motor is of a usual electrical construction and forms an actuating device for the drive and is secured to said bracket and to an outer end of said housing by nuts and bolts in a suitable manner.

The motor 13 is provided with a motor pinion 15 disposed within said housing which meshes with and drives a spur gear 16 on a transversely extending shaft 17 mounted in suitable anti-friction bearings 18, 18. One of said bearings is in the side wall of said housing adjacent said motor and the other of said bearings is mounted in an outer side cover 19. A pinion 20 is keyed on said transverse shaft and meshes with and drives a spur gear 21 which is herein shown as being a ring gear.

Figure 1:
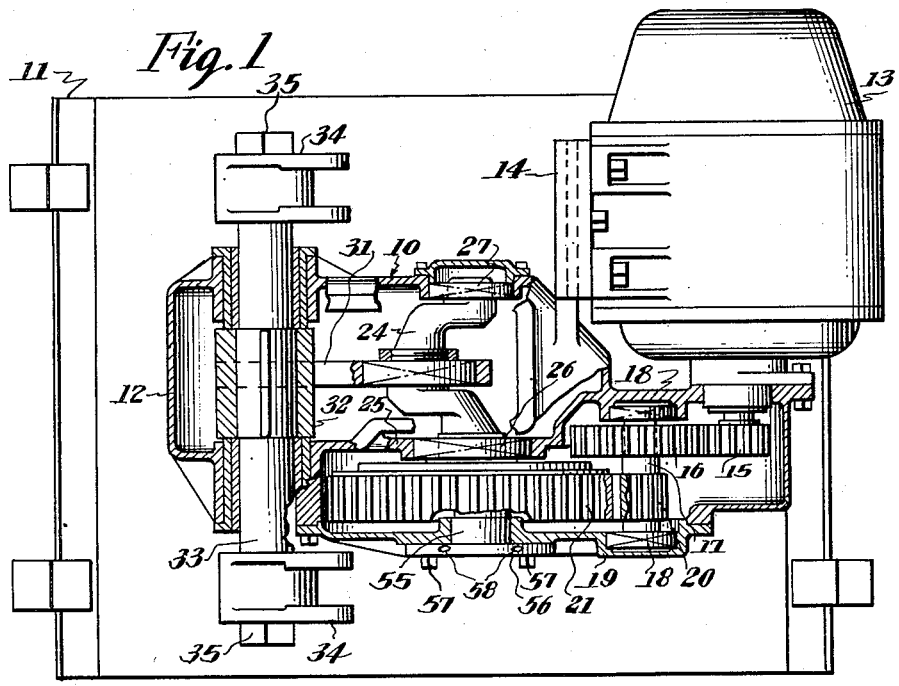
Figure 1 is a top plan view of a shaker conveyer drive constructed in accordance with my invention with certain parts broken away and shown in horizontal section.
Figure 4:
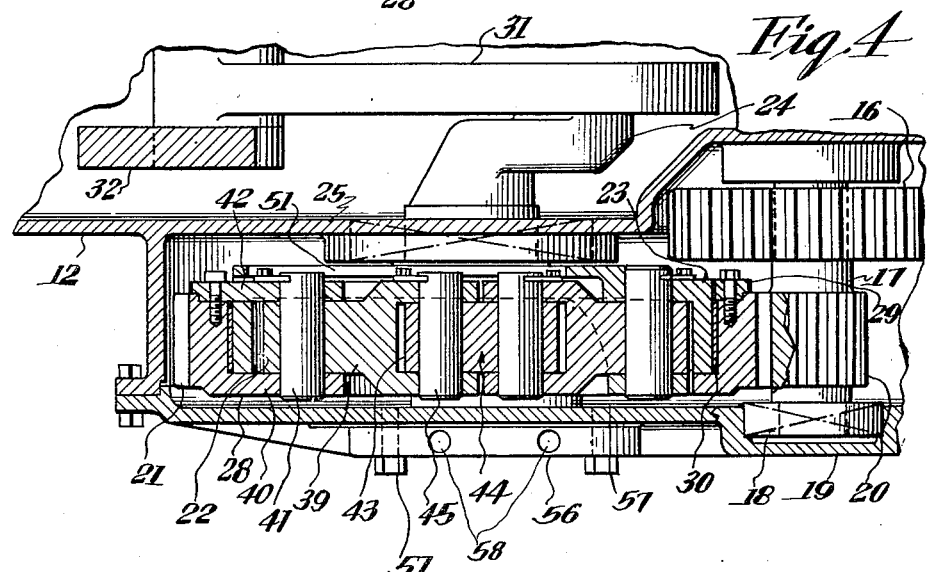
Figure 4 is an enlarged fragmentary sectional view taken substantially along lines 4—4 of Figure 3.

The spur ring gear 21 is journaled on a flange 22 of a wheel or disc 23. Said wheel is herein shown as being formed integral with a drive crank 24 which is mounted coaxial with the center of rotation of the ring gear 21. Said crank is journaled in an inner wall or partition 25 of said housing adjacent the wheel 23 in an anti-friction bearing member 26 and in an outer side wall of said housing in an anti-friction bearing member 27 (see Figures 1, 4 and 5).

The spur ring gear 21 is provided with an outer annular flange 28 which abuts the outer side of the flange 22. An annular retaining ring 29 is secured to the opposite side of said gear which abuts an inner end of a bearing member 30 mounted on the flange 22 and forming a bearing for said ring gear.

A relatively short connecting rod 31 is journaled on said crank and has pivotal connection with the lower end of a rocking arm 32. Said rocking arm is keyed on a transversely extending rocking shaft 33 journaled in said housing in suitable bearing members disposed adjacent opposite sides of said rocking arm.

Figure 2:
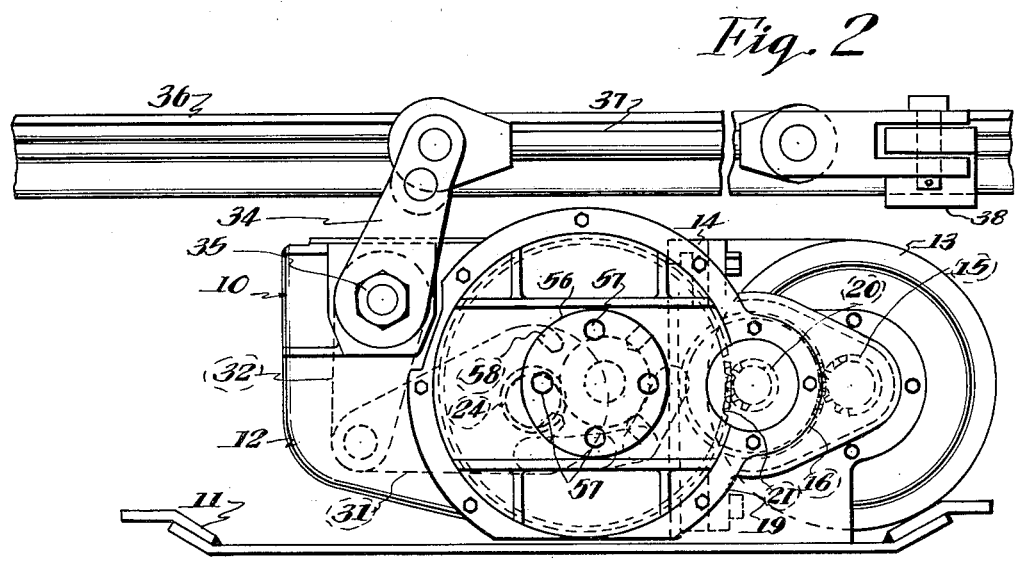
Figure 2 is a side elevation of the device shown in Figure 1 operatively connected to a conveyer trough.

The conveyer trough line is actuated by means of suitable rocking arms 34, 34 keyed to the outer end of said rocking shaft and secured thereto by means of suitable nuts 35, 35. Said rocking arms have connection with a conveyer trough 36 of the conveyer pan line by means of suitable connecting or pusher rods 37, 37 having universal pivotal connection with a transversely extending connecting member 38 secured to the bottom of said conveyer trough and extending laterally from opposite sides thereof above the bottom thereof (see Figure 2).

With the arrangement just described, the crank 24 would rotate at a uniform angular velocity if directly driven from the gear 21, assuming the speed of the motor 15 to be constant. If said crank should be so driven, the angularity of the connecting rod 31 and rocking arms 32 and 34 would be such that a conveyer trough line driven thereby would be reciprocably driven at such a variable acceleration as to cause material to move therealong, even though the velocity curve of the drive, which is used to measure the effectiveness of the drive, would be poor. As the angular velocity of said crank is corrected to vary at predetermined parts of its cycle of rotation, the velocity of the conveyer trough line will be varied, and as this variation in angular velocity of said crank from a uniform angular velocity is increased, the conveying effect of the drive will correspondingly be increased. The final conveying effect of the drive will, accordingly, be the conveying effect of the crank 24 plus the conveying effect of the connecting rod 31 and rocking arms 32 and 34.

It should be understood that if the motion of the crank 24 be corrected so it is rotated at a predetermined variable angular velocity, and that if this crank when so driven should be connected directly to a conveyer trough line by means of a pitman, as in a prior application, Serial No. 706,787, filed January 15, 1934, which issued as Patent No. 2,077,811 on April 20, 1937, that said crank and pitman would reciprocably drive said trough in such a manner as to move material therealong; the intensity of the conveying action imparted to said trough being determined by the extent of variation in the angular velocity of said crank from a uniform angular velocity.

In my present invention, a novel and simple linkage arrangement is provided to correct or vary the angular velocity of the crank 24. Said linkage arrangement includes a link 39 pivotally connected to an inwardly extending projection 40 from the annular flange 28 by means of a pin 41. Said pin extends through said projection and link and is secured at its opposite end to a projection 42 extending inwardly from the annular retaining ring 29 parallel to and in alignment with the projection 40. A suitable opening is provided in the flange 22 to permit said last-mentioned projection to extend therethrough and move with respect to said flange (see Figure 4).

Figure 3:
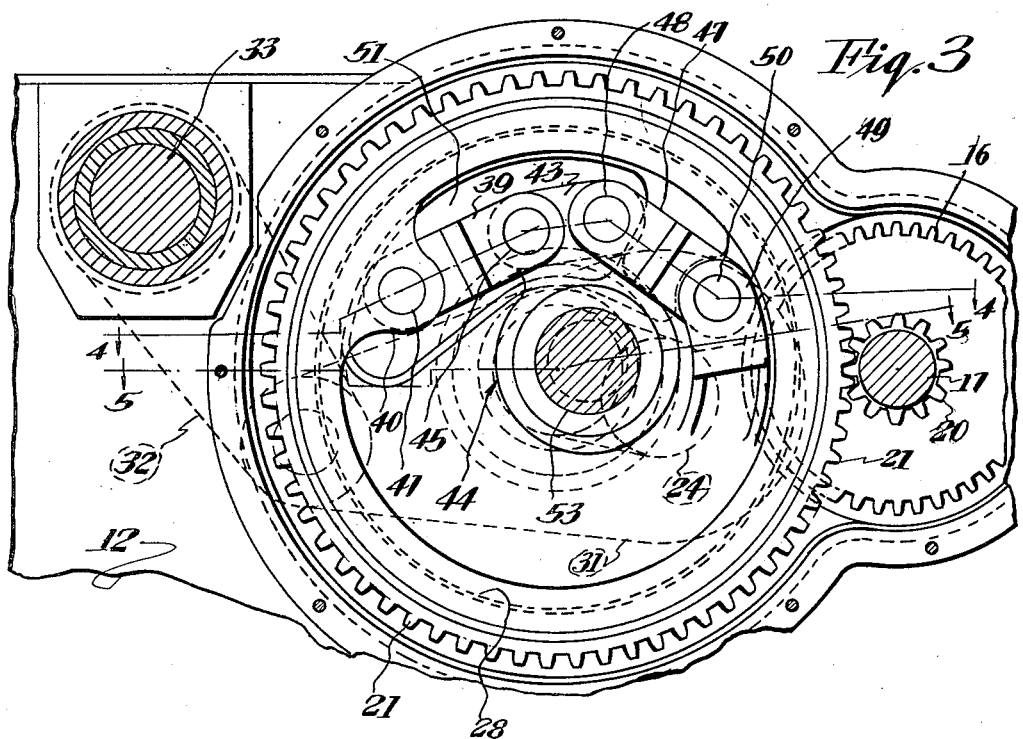
Figure 3 is an enlarged detail side view of the mechanism for varying the angular velocity of the crank with certain parts broken away and shown in vertical section.

The opposite end of said link is bifurcated and extends along opposite sides of and is pivotally connected to a projection 43 extending outwardly from an eccentric member 44 by means of a pin 45. Another link 47 has a bifurcated end which extends along opposite sides of the projection 43 and is pivotally connected to said projection by means of a pin 48. The opposite end of said link is pivotally connected to the wheel 23 by means of a pin 50 which is secured at one of its ends to said wheel and at its opposite end to a projection 49 extending from said wheel or disc. Thus, rotation of the ring gear 21 will rotatably drive the wheel 23 through the links 39 and 47 connected to the eccentric member 44. A suitable opening 51 is provided in the wheel 23 to permit movement of said links and eccentric member with respect to said wheel (see Figures 3 and 4).

Figure 5:
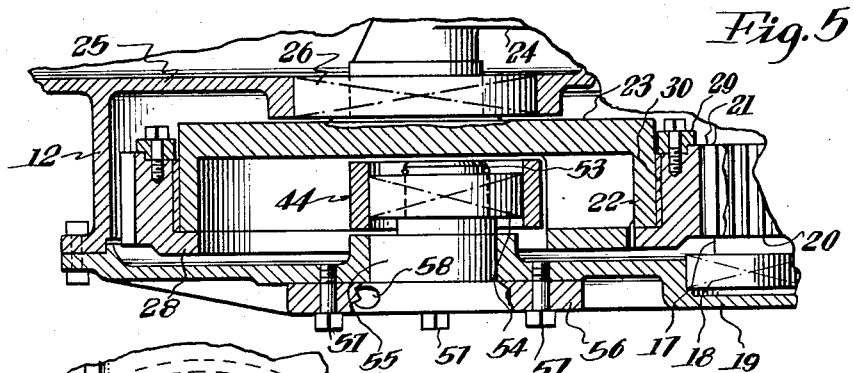
Figure 5 is an enlarged fragmentary sectional view taken substantially along lines 5—5 of Figure 3.
Figure 6:
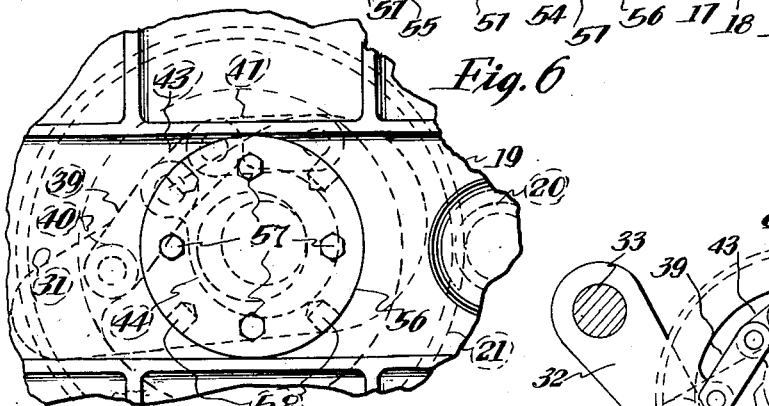
Figure 6 is an enlarged detail view of one side of the casing showing certain details of the means for changing the conveying effect of the drive mechanism.

The eccentric member 44 is journaled on a stub shaft 53 on an anti-friction bearing 54 (see Figure 5). Said stub shaft is formed integral with and eccentric of the center of a member 55 mounted in the end cover 19 for adjustable pivotal movement with respect thereto. A plate 56 is herein shown as being formed integral with the outer end of the member 55 and abuts the outer end of the cover 19. Said plate is adapted to be held in fixed relation with respect to said cover by means of cap screws 57, 57 threaded in said cover. The outer periphery of the end plate 56 is provided with a plurality of apertures 58, 58 which are adapted to receive a bar to turn said end plate and vary the eccentricity of the stub shaft 53 and eccentric member 44 with respect to the center of the ring gear 21 and crank 24, when said cap screws have been removed from said end plate and cover. When the desired position of said eccentric has been reached, said end plate may be held in fixed relation with respect to said cover by means of said cap screws.

Thus, the stub shaft 53 and eccentric member 44 may be shifted from a position coaxial with the center of rotation of the crank 24, as is diagrammatically shown in Figure 9, to an extreme position to one side of the center of rotation of said crank and ring gear, as is diagrammatically shown in Figure 5. Relative movement of said eccentric member with respect to said crank and gear during each cycle of rotation of said crank determines the variation in the angular velocity of said crank from a uniformly angular velocity and determines the conveying effect of the trough line.

In Figure 7 the stub shaft 53 and eccentric member 44 are shown as being positioned with their centers in an extreme eccentric position with respect to the center of the ring gear 21, the amount of said eccentricity being indicated by the distance between the lines a and b. When the end plate 56 is secured to the cover 19 by the cap screws 57, 57 and said stub shaft and eccentric member are locked in the position shown in this figure, relative movement between said eccentric member and the gear 21 and crank 24 will be at a maximum. Thus, the variation in angular velocity of said crank during each revolution thereof will be at a maximum and the final drive will be such that the velocity curve of the conveyer trough line will be similar to that illustrated by curve A in Figure 10. This curve indicates that the deceleration of the trough line is relatively rapid for the latter portion of the forward stroke, which results in a rapid reversal in the direction of travel of said trough line and a relatively high rate of coal travel. The conveying effect of the drive when so positioned is suitable for efficiently conveying material at a relatively high rate of speed for a short distance up grade along a light pan line or along a relatively heavy level pan line or for a longer distance along a lighter level pan line.

In Figure 8 the eccentricity of the stub shaft 53 and eccentric member 44 has been decreased and is indicated by the space between the lines c and d. When said eccentric member is in such a position relative movement of said eccentric member with respect to the ring gear 21 and crank 24 is decreased from that shown in Figure 7, with a resultant decrease in the intensity of the drive. In this position, the velocity curve of the trough line will be similar to that indicated by curve B in Figure 10. This curve shows that the rate of reversal of the pan line at the end of the forward stroke is less rapid which results in a corresponding decrease in the maximum forces of the drive and a decrease in stresses per unit of weight on the drive mechanism. Thus, when said eccentric member is positioned, as in Figure 8, the mechanism may safely be used for economically moving coal along a trough line of greater length or weight than the mechanism shown in Figure 7, with the same stresses per unit of pan weight on the drive mechanism.

In Figure 9 the center of the stub shaft 53 coincides with the center of rotation of the ring gear 21 and crank 24 with the result that said crank is driven at a uniform angular velocity. Thus, the only conveying effect imparted to the trough line is that obtained by angularity in movement of the short connecting rod 31 and rocking arms 32 and 34. This results in a velocity curve of the trough line which is similar to that indicated by curve C in Figure 8. As may be seen in comparing this curve with curves A and B, the acceleration rate of the trough line has been increased a slight amount from curve B, but the rate of reversal of the pan line at the end of the forward stroke is less violent, with a resultant decrease in material travel along the pan line and reduction in stresses on the trough mechanism and pan line. This results in a conveying action which may effectively convey material along a relatively long trough line at a lesser velocity than the motions indicated by curves A and B, but with less stresses on the conveyer drive mechanism and trough line.

It will be seen from the foregoing that a new and improved means of a novel construction has been provided for varying the angular velocity of the drive crank for a shaker conveyer mechanism which is of a simple and efficient construction and which permits ready variation of the conveying effect of the drive when desired.

While I have herein shown and described one form of my invention, I do not wish to be limited to the precise details of construction or arrangement of parts herein shown and described, excepting as specifically limited in the appended claims.

I claim as my invention:

1. In a shaker conveyer drive and in combination with a reciprocably driven conveyer trough, a gear rotatable at a uniform angular velocity, a crank disposed coaxial with said gear and a drive connection from said crank to said conveyer trough, and a connection from said gear to said crank for driving said crank at a predetermined variable angular velocity comprising an eccentric member, a link connected between said gear and eccentric member, and another link connected between said eccentric member and crank.

2. In a shaker conveyer drive and in combination with a reciprocably driven conveyer trough, a gear rotatable at a uniform angular velocity, a crank disposed coaxial with said gear and a drive connection from said crank to said conveyer trough, and a connection from said gear to said crank for driving said crank at a predetermined variable angular velocity comprising an eccentric member, a link connected between said gear and eccentric member, another link connected between said eccentric member and crank, and means permitting the eccentricity of said eccentric member to be changed to change the amount of variation in the angular velocity of said crank.

3. In a shaker conveyer drive and in combination with a reciprocably driven conveyer trough, a gear rotatable at a uniform angular velocity, a crank disposed coaxial with said gear and a drive connection from said crank to said conveyer trough, and a connection from said gear to said crank for driving said crank at a predetermined variable angular velocity comprising an eccentric member mounted for rotational movement about an axis parallel to but eccentric of the axis of rotation of said crank and gear, a link pivotally connected between said gear and eccentric member for rotating said eccentric member, and another link pivotally connected between said eccentric member and crank for rotating said crank.

4. In a shaker conveyer drive and in combination with a reciprocably driven conveyer trough, a gear rotatable at a uniform angular velocity, a crank disposed coaxial with said gear and a drive connection from said crank to said conveyer trough, and a connection from said gear to said crank for driving said crank at a predetermined variable angular velocity comprising an eccentric member mounted for rotational movement about an axis parallel to but eccentric of the axis of rotation of said crank and gear, a link pivotally connected between said gear and eccentric member for rotating said eccentric member, and another link pivotally connected between said eccentric member and crank for rotating said crank.

5. In a shaker conveyer drive, a uniformly rotatable member, a crank driven thereby at a predetermined variable angular velocity, a rocking member, a connection from said rocking member to a conveyer trough for reciprocably driving said conveyer trough, a connection between said crank and rocking member, and a connection between said uniformly rotatable member and crank for driving said crank at a variable angular velocity comprising a member mounted for pivotal movement about an axis eccentric of the center of said uniformly rotatable member, a link connected between said uniformly rotatable member and eccentric member, and another link connected between said eccentric member and crank.

6. In a shaker conveyer drive, a uniformly rotatable member, a crank driven thereby at a predetermined variable angular velocity, a rocking member, a connection from said rocking member to a conveyer trough for reciprocably driving said conveyer trough, a connection between said crank and rocking member, and a connection between said uniformly rotatable member and crank for driving said crank at a variable angular velocity comprising a member mounted for pivotal movement about an axis eccentric of the center of said uniformly rotatable member, a link connected between said uniformly rotatable member and eccentric member, another link connected between said member and crank, and means permitting the eccentricity of said eccentric member to be changed to change the amount of variation in the angular velocity of said crank.

7. In a shaker conveyer drive, a uniformly rotatable gear, a crank driven thereby at a predetermined variable angular velocity, a rocking member, a connection from said rocking member to a conveyer trough for reciprocably driving said conveyer trough, a connecting rod connected between said crank and rocking member, and a connection between said gear and crank for driving said crank at a predetermined variable angular velocity comprising an eccentric member mounted for rotational movement about an axis parallel to but eccentric of the axis of rotation of said crank and gear, a link pivotally connecting said gear with said eccentric member for rotating said eccentric member, and another link pivotally connecting said eccentric member with said crank for rotating said crank.

8. In a shaker conveyer drive, a uniformly rotatable gear, a crank driven thereby at a predetermined variable angular velocity, a rocking member, a connection from said rocking member to a conveyer trough for reciprocably driving said conveyor trough, a connecting rod connected between said crank and rocking member, and a connection between said gear and crank for driving said crank at a predetermined variable angular velocity comprising an eccentric member mounted for rotational movement about an axis parallel to but eccentric of the axis of rotation of said crank and gear, a link pivotally connecting said gear with said eccentric member for rotating said eccentric member, another link pivotally connecting said eccentric member with said crank for rotating said crank, and means permitting the eccentricity of said eccentric member to be changed to change the amount of variation in the angular velocity of said crank.

9. In a drive mechanism for shaker conveyers, a reciprocably driven conveyer trough, a drive member rotatable at a substantially uniform angular velocity, a crank coaxial with said drive member and adapted to be driven therefrom at a variable angular velocity, a drive connection from said crank to said conveyer trough, and a drive connection from said drive member to said crank comprising an eccentric member, a link connecting said drive member with said eccentric member for rotatably driving said eccentric member, and another link connecting said eccentric member with said crank for rotatably driving said crank at a predetermined variable angular velocity.

10. In a drive mechanism for shaker conveyers, a reciprocably driven conveyer trough, a drive member rotatable at a substantially uniform angular velocity, a crank coaxial with said drive member and adapted to be driven therefrom at a variable angular velocity, a drive connection from said crank to said conveyer trough, and a drive connection from said drive member to said crank comprising an eccentric member, a link connecting said drive member with said eccentric member for rotatably driving said eccentric member, another link connecting said eccentric member with said crank for rotatably driving said crank at a predetermined variable angular velocity, and means permitting the eccentricity of said eccentric member with respect to said drive member to be changed to change the amount of variation in the angular velocity of said crank.

WILLIAM W. SLOANE.